US010664515B2

(12) United States Patent
Sacheti et al.

(10) Patent No.: US 10,664,515 B2
(45) Date of Patent: May 26, 2020

(54) TASK-FOCUSED SEARCH BY IMAGE

(71) Applicant: MICROSOFT TECHNOLOGY LICENSING, LLC, Redmond, WA (US)

(72) Inventors: Arun Sacheti, Sammamish, WA (US); Ming Ye, Bellevue, WA (US); Linjun Yang, Sammamish, WA (US); Karim Hasham, Bellevue, WA (US); Pavel Komlev, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 503 days.

(21) Appl. No.: 14/975,340

(22) Filed: Dec. 18, 2015

(65) Prior Publication Data

US 2016/0350333 A1    Dec. 1, 2016

Related U.S. Application Data

(60) Provisional application No. 62/168,572, filed on May 29, 2015.

(51) Int. Cl.
| | | |
|---|---|---|
| *G06F 7/00* | (2006.01) | |
| *G06F 16/583* | (2019.01) | |
| *G06T 1/00* | (2006.01) | |
| *G06F 3/0481* | (2013.01) | |
| *G06F 16/248* | (2019.01) | |
| *G06F 16/9535* | (2019.01) | |
| *G06F 16/14* | (2019.01) | |

(52) U.S. Cl.
CPC ........ *G06F 16/5838* (2019.01); *G06F 3/0481* (2013.01); *G06F 16/248* (2019.01); *G06F 16/583* (2019.01); *G06F 16/9535* (2019.01); *G06T 1/0007* (2013.01); *G06F 16/156* (2019.01)

(58) Field of Classification Search
CPC ..................................................... G06F 16/156
USPC ......................................................... 707/705
See application file for complete search history.

(56) References Cited

U.S. PATENT DOCUMENTS

| | | | |
|---|---|---|---|
| 6,487,553 | B1 | 11/2002 | Emens et al. |
| 7,158,966 | B2 | 1/2007 | Brill et al. |
| 7,356,679 | B1 * | 4/2008 | Le .................. G06F 9/45558 713/1 |
| 7,620,622 | B1 * | 11/2009 | Larsson ............. G06F 16/94 |
| 8,190,604 | B2 | 5/2012 | Wen et al. |

(Continued)

FOREIGN PATENT DOCUMENTS

GB          2465378 A          5/2010

OTHER PUBLICATIONS

"Office Action Issued in European Patent Application No. 16727108. 9", dated Jul. 29, 2019, 8 Pages.

(Continued)

*Primary Examiner* — Eliyah S. Harper
(74) *Attorney, Agent, or Firm* — Shook, Hardy and Bacon, L.L.P.

(57) ABSTRACT

Systems, computing devices, and methods for performing an image search are presented. A search query including an image is received from a user. A segment associated with the image is identified. A user intent associated with the image and the segment is identified. Search results associated with the identified segment and user intent are generated, and presented to the user.

20 Claims, 8 Drawing Sheets

(56) References Cited

U.S. PATENT DOCUMENTS

| | | | |
|---|---|---|---|
| 8,200,010 B1 | 6/2012 | Jing et al. | |
| 8,385,646 B2 | 2/2013 | Lang et al. | |
| 8,463,053 B1* | 6/2013 | Guo | G06F 17/10 |
| | | | 382/225 |
| 8,543,592 B2 | 9/2013 | Agrawal et al. | |
| 8,640,032 B2 | 1/2014 | Priyadarshan et al. | |
| 8,831,349 B2 | 9/2014 | Mei et al. | |
| 8,868,548 B2 | 10/2014 | Kurzion | |
| 8,880,563 B2 | 11/2014 | Lin et al. | |
| 8,892,594 B1 | 11/2014 | Khafizov et al. | |
| 8,977,629 B2* | 3/2015 | Goswami | G06Q 30/02 |
| | | | 707/748 |
| 9,582,482 B1* | 2/2017 | Sharifi | H04W 4/18 |
| 2002/0054059 A1* | 5/2002 | Schneiderman | G06F 40/169 |
| | | | 715/700 |
| 2004/0100483 A1* | 5/2004 | Russell | G06K 9/48 |
| | | | 715/719 |
| 2005/0071736 A1* | 3/2005 | Schneider | G06F 16/435 |
| | | | 715/201 |
| 2006/0074870 A1 | 4/2006 | Brill et al. | |
| 2006/0230334 A1 | 10/2006 | Slawson et al. | |
| 2009/0313239 A1 | 12/2009 | Wen et al. | |
| 2011/0025714 A1* | 2/2011 | Ptucha | G06F 16/5838 |
| | | | 345/641 |
| 2011/0176724 A1 | 7/2011 | Yang et al. | |
| 2012/0030152 A1* | 2/2012 | Pueyo | G06Q 30/00 |
| | | | 706/12 |
| 2012/0109943 A1 | 5/2012 | Yang et al. | |
| 2012/0158739 A1* | 6/2012 | Ah-Pine | G06F 17/18 |
| | | | 707/748 |
| 2013/0013578 A1 | 1/2013 | Yang et al. | |
| 2013/0246392 A1 | 9/2013 | Farmaner et al. | |
| 2016/0283564 A1* | 9/2016 | Sharon | G06F 17/30554 |

OTHER PUBLICATIONS

"Search by Image", Retrieved on: May 20, 2015, Available at: https://images.google.com/?gwsrd=ssl.

Kasture, et al., "Internet Image Search Based on User Intention", In International Journal of Advance Research in Computer Science and Management Studies, vol. 2, Issue 6, Jun. 2014, 6 pages.

Smith, et al., "VisualSEEk: A fully Automated Content-based Image Query System", In Proceedings of the fourth ACM international conference on Multimedia, Nov. 18, 1996, 12 pages.

Khandre, et al., "A Review on Web Image Retrieval Techniques", In International Journal of Computer Science and Information Technologies, vol. 6, Issue 2, Mar. 2015, 4 pages.

Sunitha, et al., "Extended Image Features for User Intention Refined Image Search", In International Journal of Advanced Research in Computer Science and Software Engineering, vol. 4, Issue 2, Feb. 2014, 5 pages.

U.S. Appl. No. 62/085,053, Sacheti et al., "Efficiently Discovering and Surfacing Content Attributes", filed Nov. 26, 2014.

"Second Written Opinion Issued in PCT Application No. PCT/US2016/034125", dated May 15, 2017, 7 Pages.

"International Preliminary Report on Patentability Issued in PCT Application No. PCT/US2016/034125", dated Aug. 16, 2017, 9 Pages.

"International Search Report and Written Opinion Issued in PCT Application No. PCT/US2016/034125", dated Aug. 26, 2016, 11 Pages.

* cited by examiner

TASK-FOCUSED SEARCH BY IMAGE

CROSS-REFERENCE TO RELATED APPLICATIONS

This application claims the benefit of U.S. Provisional Application No. 62/168,572, filed May 29, 2015, entitled "Task-Focused Search By Image," which is incorporated herein by reference in its entirety.

BACKGROUND

As people view more and more online content, especially non-textual content (which includes images, video, audio, and the like), they are ever curious regarding that content and often would like to know more. For example, as a person (a computer user) views content of an associate's online blog, the computer user may encounter an image of which he/she may wish to know more. Indeed, even when the image is captioned and/or the surrounding content describes aspects of the subject matter of the image, the view/computer user may still have questions that are not answered, at least not answered without taking specific actions to find the information.

Alternatively, a computer user may want to perform a Web search task that is difficult to formulate in words, for example, buying a fashion item by its look, finding a travel destination (or other location) based on a photo, and so forth. Searching by image (vs. searching by text) is the logical thing to do in such scenarios. Many such tasks are research in nature—people search without a definitive object to acquire, but rather they need a lot of visual assisted exploration to form opinions and narrow down to what exactly to pursue. Some providers have implemented a general search-by-image feature which sometimes returns a text annotation for the query image, but the search relevance and annotation coverage are not typically satisfactory. Some applications utilize human crowdsourcing for annotations and present corresponding text search results. The annotations are often too vague, and because the search results are based on the textual annotations, the results are not visual centric. In general, relevance of the search results is not satisfactory and an efficient the interactive refinement experience is not provided. Also missing is the platform support to commoditize visual search and enable a vibrant ecosystem.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an aspect, a method for performing an image search is provided. A search query including an image is received from a user. A segment associated with the image is identified. A user intent associated with the image and the segment is identified. Search results associated with the identified segment and user intent are generated, and presented to the user. The technology described herein can provide a more efficient search session for the user by providing relevant results without multiple searches.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

The technology described herein can provide a more efficient search session for the user by providing relevant results without multiple searches. Often times when looking at content on the web through an image search, a user intends to complete a task that is related to the image as a whole, or related to one or more objects depicted within the image. For example, a user may want to buy a certain item depicted within the image, find a recipe of a food item depicted within the image, look for a travel destination based on the image, and so forth.

It is desirable for an image that is presented to a user to include all the required information for task completion. However, such is not always the case, as there may not be enough content available for the image content currently being viewed or the information presented may not meet the user's desired intent (e.g., the price of an item in image may be too high, a food recipe for an item in the image may be too complex, and so forth). In such cases, the user would be greatly benefited if presented with visually similar images focused around task completion based on the content within the image (and/or additional information), so the user can browse through the resultant set of visually similar content in order to complete the user's intended task. The additional information may include data from a Web page that hosts the image, or data from a mobile device which provides the image (such as GPS data, time of day, and so forth). The additional information may also include contextual location data. For example, if the user invokes the search while at a store, it may be determined that the user intends to do comparison shopping. As another example, if the user invokes a search for food while in a restaurant, it may be determined that the user wants to count calories rather than search for a recipe, whereas if the user submits an image of food pictured on a magazine cover, it may be determined that the user is searching for a recipe.

Some aspects provide one or more of: multimodal visual search relevance (e.g., visual+optional text+optional mobile-device sensor information); relevance feedback (for sessions and/or users), both the UX and relevance aspects; a general visual search; segment detection and segment specific models; a platform to enable new applications in supported segments; a platform to bootstrap new segments; the ability to detect a primary set of task completion intents within the query image presented to the consumer; for multiple intents, an interactive experience for the user to refine the intent when multiple (or no) potential intents are identified; constraining the result set to help the user complete the specific task; and an ability to plug in a segment-specific visually-similar ranker so that the visual search can scale to a wide variety of web scenarios and scale to billions of image documents.

In an aspect of the disclosed subject matter, a visual content store is provided. The visual content store includes a database of images and additional information associated with the images, such as annotations which describe attributes and/or aspects of the images stored in the database. The visual content store may be implemented on a user computing device, implemented remotely from the user device, for example, on one or more network devices, or may be distributed between the user device and/or one or more network devices. In an aspect, a visual search system provides a visual search function provided to a user, and is configured to interact with the visual content store to obtain additional information regarding one or more items of visual content that are presented/displayed to the user on the user device. According to various aspects, upon detecting a user indication to obtain more information or perform a visual search regarding a particular image, the visual search system accesses the visual content store to determine whether the image matches an image in the visual content store. If so, the visual search system may retrieve at least a portion of the information for presentation to the user.

Additionally, or alternatively, the retrieved information may be utilized to identify a segment associated with the image, and/or a user intent/task associated with the image. As used herein, a "segment" is a category or classification of a particular type of person, place, thing, activity, place, and so forth, which is utilized to constrain the search results of an image search. Examples of segments include celebrities, actors, politicians, countries, states, cities, parks, vacation spots, playgrounds, clothing, dresses, sweaters, jewelry, pets, dogs, cats, movies, plays, sporting events, and so forth. When a segment associated with a query image is identified, image searching may then be constrained to images/information which corresponds to the identified segment.

For example, if a user/customer wants to buy a pair of shoes, but doesn't know exactly which shoes, the user may submit an image of a pair of shoes in an image search to a visual search system. Upon identifying that the image includes a pair of shoes, the visual search system may select a "shoes" segment that corresponds to content related to shoes. The visual search function may learn what the customer likes and dislikes based on visual images, for example, the visual search system may present a series of images to the user which are visually similar to the image that was submitted, i.e., which include shoes. The visual search system may thus educate the user about options, based on the various types of shoe images, and may in essence conduct a dialog with the user to refine suggestions to narrow down further images/selections that are presented to the user. The shopping process is thus rendered both pleasant and efficient. Sometimes such activities are more for the user's entertainment than task completion (similar to "window shopping"). The common need here is to allow interactive visual-centric searching, referred to herein as visual search or image search. The need for an efficient and relevant visual search is ever increasing with mobile-based information consumption which has a much stronger demand on visual content than desktop consumption.

In a first aspect, a method of image searching is provided. A search query which includes an image is received from a user. A user intent associated with the image is identified. Search results associated with the user intent are generated and presented to the user.

In a second aspect, a method of performing an image search is provided. A search query comprising an image is received. A segment associated with the image is identified. A user intent associated with the image and the segment is identified. Search results are generated which are associated with the identified user intent and the segment, and are presented to the user.

In a third aspect, a method of performing an image search is provided to a user. A search query comprising an image is received. One or more segments associated with the image are identified. A user-selectable option is presented to the user, which enables a user selection of one or more segments from the identified one or more segments. A selection of one or more segments is received. A respective user intent associated with each of the one or more selected segments is identified. Respective search results are generated from each of the selected one or more segments, based on the image. The respective search results are presented to the user.

In a fourth aspect, identifying a user intent associated with the image includes analyzing content of the image to identify one or more potential user intents associated with the image, presenting on a user interface an option for the user to select from the one or more potential user intents, receiving a selection of a potential user intent, such that the selected potential user intent is identified as the user intent associated with the image.

In a fifth aspect, identifying a user intent associated with the image includes analyzing content of the image to identify one or more potential user intents associated with the image, presenting on a user interface an option for the user to select one or more refinement parameters, receiving a selection of one or more refinement parameters, and utilizing the selected one or more refinement parameters to identify the user intent from among the identified one or more potential user intents.

In a sixth aspect, identifying a segment associated with the image includes analyzing content of the image to identify one or more potential segments associated with the image, presenting on a user interface an option for the user to select from the one or more potential segments, receiving a selection of a potential segment, such that the selected potential segment is identified as the segment associated with the image.

In a seventh aspect, analyzing content of the image to identify one or more potential segments associated with the image includes accessing an image database that includes images and associations between the images and respective attributes, determining whether the database includes an image that matches the received image, when the database includes an image that matches the received image, then accessing the respective attributes associated with the matching image to ascertain one or more segments previously associated with the matching image, and identifying the one or more segments previously associated with the matching image as the one or more potential segments associated with the image.

Figure 1:
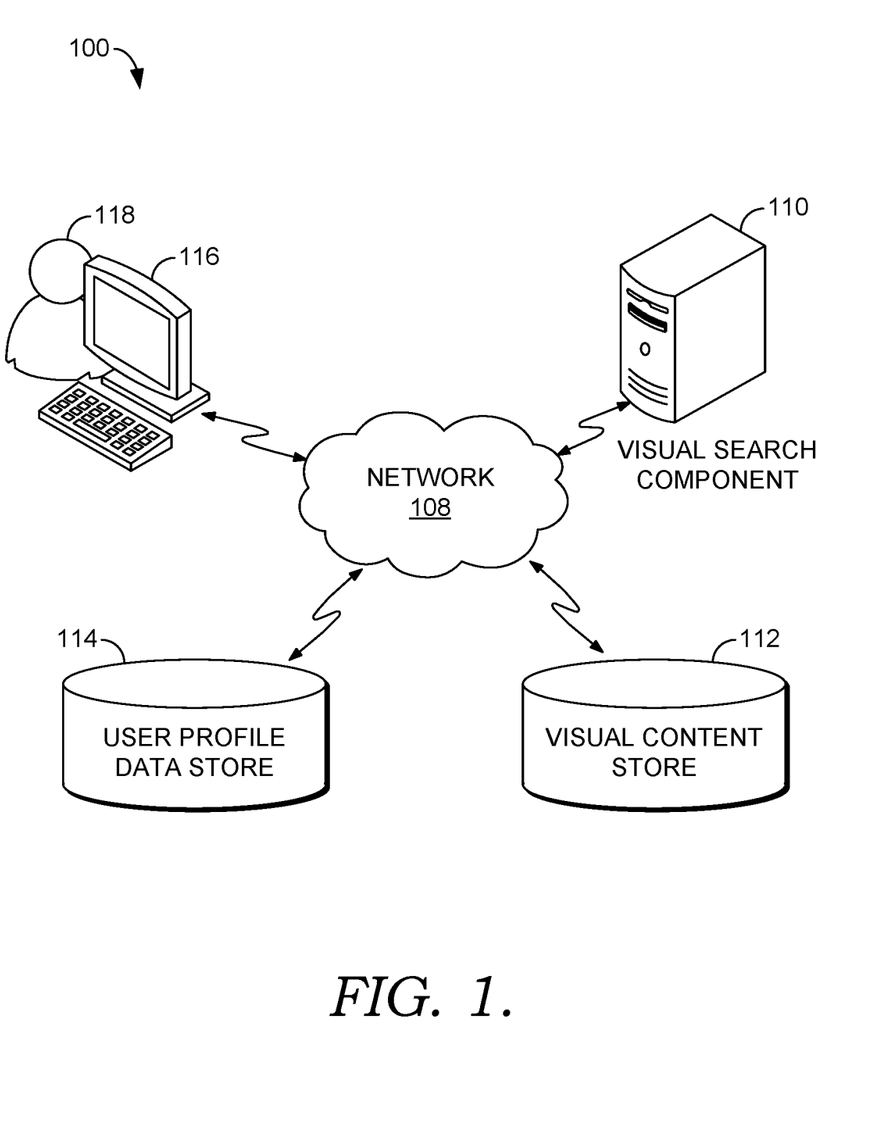
FIG. 1 is a high-level illustration depicting an exemplary operating environment suitable for use with an aspect of the technology described herein.

With this general description of the disclosed subject matter in mind, reference is now made to the figures. Referring now to FIG. 1, a high-level illustration is depicted of an exemplary operating environment suitable for use with an aspect of the technology described herein, and is generally referred to as system 100. System 100 is but one example of a suitable computing environment and is not intended to suggest any limitation as to the scope of use or functionality of aspects. Neither should the system 100 be interpreted as having any dependency or requirement relating to any one or combination of components illustrated. System 100 includes a visual search component 110, a visual content store 112, a user profile data store 114, and a user device 116 which is associated with a user 118. In an aspect, one or more of the various elements of system 100 communicate via a network 120. In some aspects, system 100 may include additional elements not shown, or may contain fewer elements than are shown.

Visual search component 110 is configured to receive an image search query submitted by user 118 via user device 116. In addition to an image, the search query may include multi-modal input provided by the user, either implicitly or explicitly, such as data from a Web page that hosts the image, mobile device sensor information, and so forth. Visual search component 110 identifies a user intent associated with the image. The user intent may be a task-completion intent, which is an intent to perform or complete a specific task that is related to, or associated with, the image or one or more features depicted in the image. Identifying the user intent associated with the image may include accessing visual content store 112. In an aspect, visual content store 112 includes a database of images and additional information associated with the images, such as annotations which describe attributes and/or aspects of the images stored in the database. Although visual content store 112 is depicted as a separate entity, in some aspects visual content store may be distributed between multiple storage devices and/or distributed between user device 116 and one or more storage devices. In an aspect, the additional information associated with the images stored in visual content store 112 includes one or more user intents that have previously been determined to be associated with the stored images.

Visual search component 110 may access or search visual content store 112 to determine whether the image submitted by user 118 matches any of the images stored in visual content store 112. The term "match" as used in this context may include an exact match, but is not limited to an exact match. In an aspect, a match may be determined if the image is an altered version of a stored image. For example, a match may be determined if the submitted image is a scaled version of a stored image. A match may be determined if the submitted image is a color-adjusted (e.g., black-and-white) version of a stored color image, or vice versa. A match may be determined if the submitted image is identical (or similar) to a cropped portion of a stored image, or vice versa. In various aspects, a "match" may be determined based on a combination of any or all of the above types of matches, among others. If a match is found, visual search component 110 may retrieve at least a portion of the information associated with the matching stored image and use the retrieved information to identify one or more user intents previously associated with the stored image.

Identifying the user intent associated with the submitted image may include accessing user profile data store 114, either in addition to, or instead of, accessing visual content store 112. In an aspect, user profile data store 114 includes user profile data associated with user 118. The user profile data may include user preferences, user likes and dislikes for various products, activities, types of entertainment, websites, and so forth. The user profile data may also include a history of prior searches performed by user 118, either in a current search session or in previous search sessions. Visual search component 110 may access or search user profile data store 114 to determine whether the image, or one or more features depicted in the image, is associated with the user's preferences, likes, dislikes, and so forth. In an aspect, if the search of visual content store 112 described above results in a plurality of user intents associated with the submitted image, information from the user's profile is utilized to filter, or constrain, the identified user intents to those which comport with the users' interests and so forth. In an embodiment, historical information regarding other users' searches, purchases, online activities, and so forth, are utilized to identify and/or filter one or more user intents associated with an image.

Visual search component 110 is further configured to perform an image-based search utilizing the submitted image, and constraining the results of the search to those results that align with the identified user intent. The search results presented to the user by visual search component 110 will thus enable the user to efficiently perform or complete the task associated with the user intent.

In an aspect, visual search component 110 is configured to refine or constrain the identified user intents based on an interactive session with user 118. For example, if the search of visual content store 112 described above results in a plurality of user intents associated with the submitted image, visual search component may present to the user one or more selectable options to refine the determination of the user intent. The options may include specific selections or questions, such as: "Are you wanting to purchase an item?"; "Are you interested in the dress or the jewelry?"; and so forth. An option may also include a text entry filed, in which the user 118 can enter one or more textual search terms. The options that are presented may be determined based on identified features that are depicted in the submitted image, for example, if the image depicts a woman wearing a dress an some particular type of jewelry, the dress and the jewelry may each be identified as features in the image. Once the refinement options have been received from user 118, visual search component 110 may utilize the received refinement options to filter or constrain the user intent, and perform an image-based search based on the identified user intent.

Figure 2:
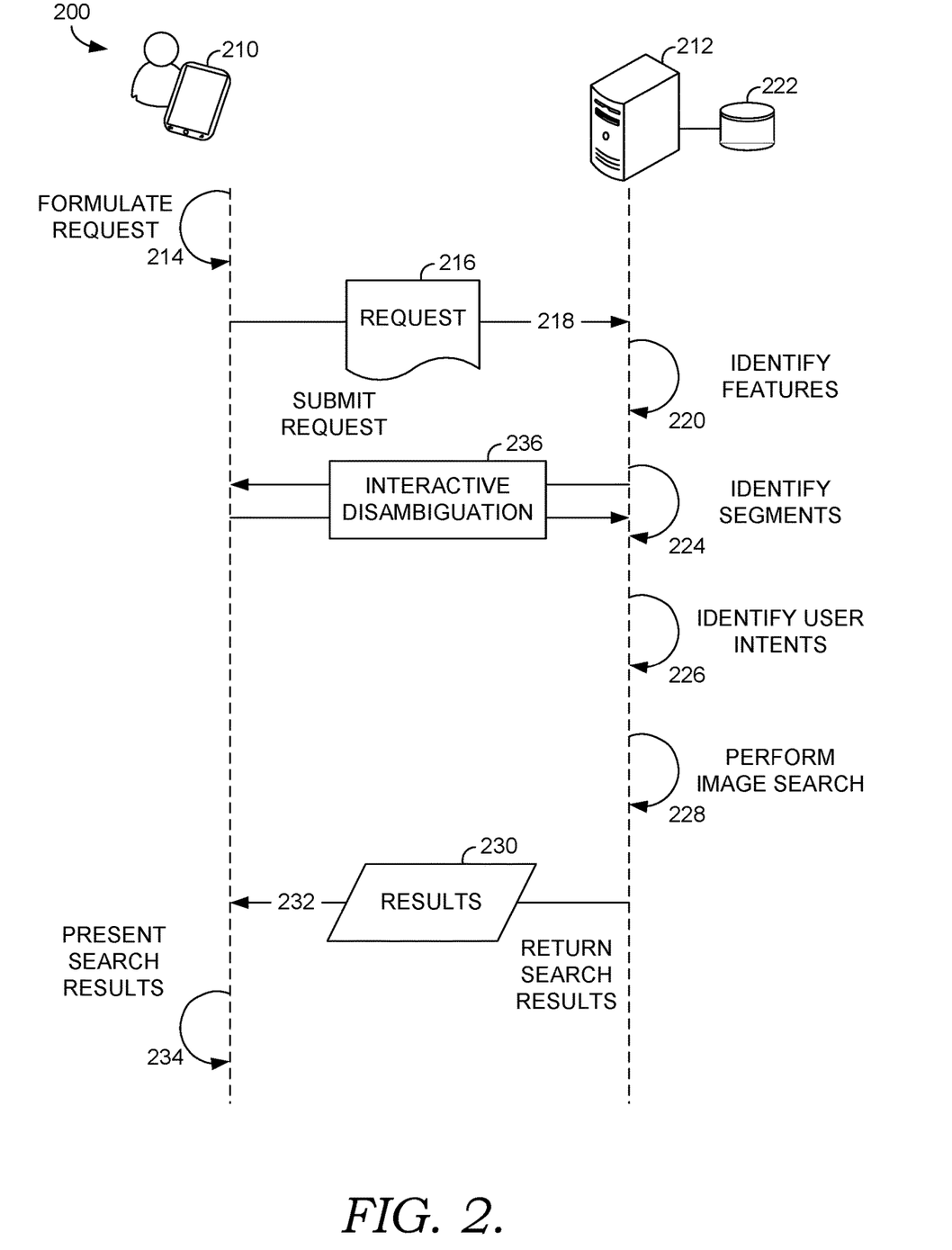
FIG. 2 illustrates an exemplary exchange between a user computing device and a visual search system, suitable for use with an aspect of the technology described herein.

Referring now to FIG. 2, depicted is an exemplary exchange 200 between a user computing device 210 and a visual search system 212, suitable for use with an aspect of the technology described herein, generally referred to as exchange 200. Exchange 200 is but one example of a suitable exchange and is not intended to suggest any limitation as to the scope of use or functionality of aspects. Neither should exchange 200 be interpreted as having any dependency or requirement relating to any one or combination of components illustrated.

As indicated by arrow 214, a request 216 is generated/formulated at user device 210 to perform an image search. According to aspects of the disclosed subject matter, the request 216 includes an image provided by user 210. In various aspects, user 210 may select the image from images stored on user device 210. Alternatively or additionally, user 210 may select an image that is presented online. A copy or portion of the image may be included in request 216, and/or an address of the image (such as a URL or other pointer) which identifies the image may be included in request 216.

In addition to the image or image identifier, contextual information may be included in request 216. The contextual information may include an annotation, textual information, captions associated with the content and/or descriptions related to the content, a selection of one or more individual features within the image, and/or other types of information that may be used to refine the image search. The contextual information may also include data from a Web page that hosts the image, sensor information data from a mobile device (such as GPS data, time of day, and so forth), and/or contextual location data. Once request 216 is generated or formulated, it is submitted to visual search system 212, as indicated by arrow 218. Upon receiving request 216, visual search system 212 identifies features depicted in the query image, as indicated by arrow 220. In an aspect, the features are identified based on image recognition techniques trained on previously-identified images and image features. The additional information provided in request 216 may also be utilized in recognizing features depicted in the image. Based on the image and/or the identified features, visual search system 212 may access a visual content store 222 which stores a database of images and previously associated attributes. Visual content store 222 may be part of visual search system 212 or may be separate from visual search system 212. Information accessed in visual content store 222 is utilized to identify one or more segments associated with the query image, as indicated by arrow 224. When multiple segments are identified, visual search system 212 may utilize a process of interactive segment disambiguation 236, in which a dialog occurs with the user to identify the most relevant segment(s). Visual search system 212 may also access visual content store 222 to identify one or more user intents associated with the query image, as indicated by arrow 226. When multiple intents are identified, visual search system 212 may utilize a process of interactive intent disambiguation (not shown), in which a dialog occurs with the user to identify the most relevant intent(s). As indicated by arrow 228, visual search system 212 performs an image search constrained by one or more identified segments, and constrains or filters the search results 230 based on one or more of the identified user intents. Search results 230 are returned to user device 210, as indicted by arrow 232, where the search results 230 are is presented to the computer user, as indicated by arrow 234.

Figure 3:
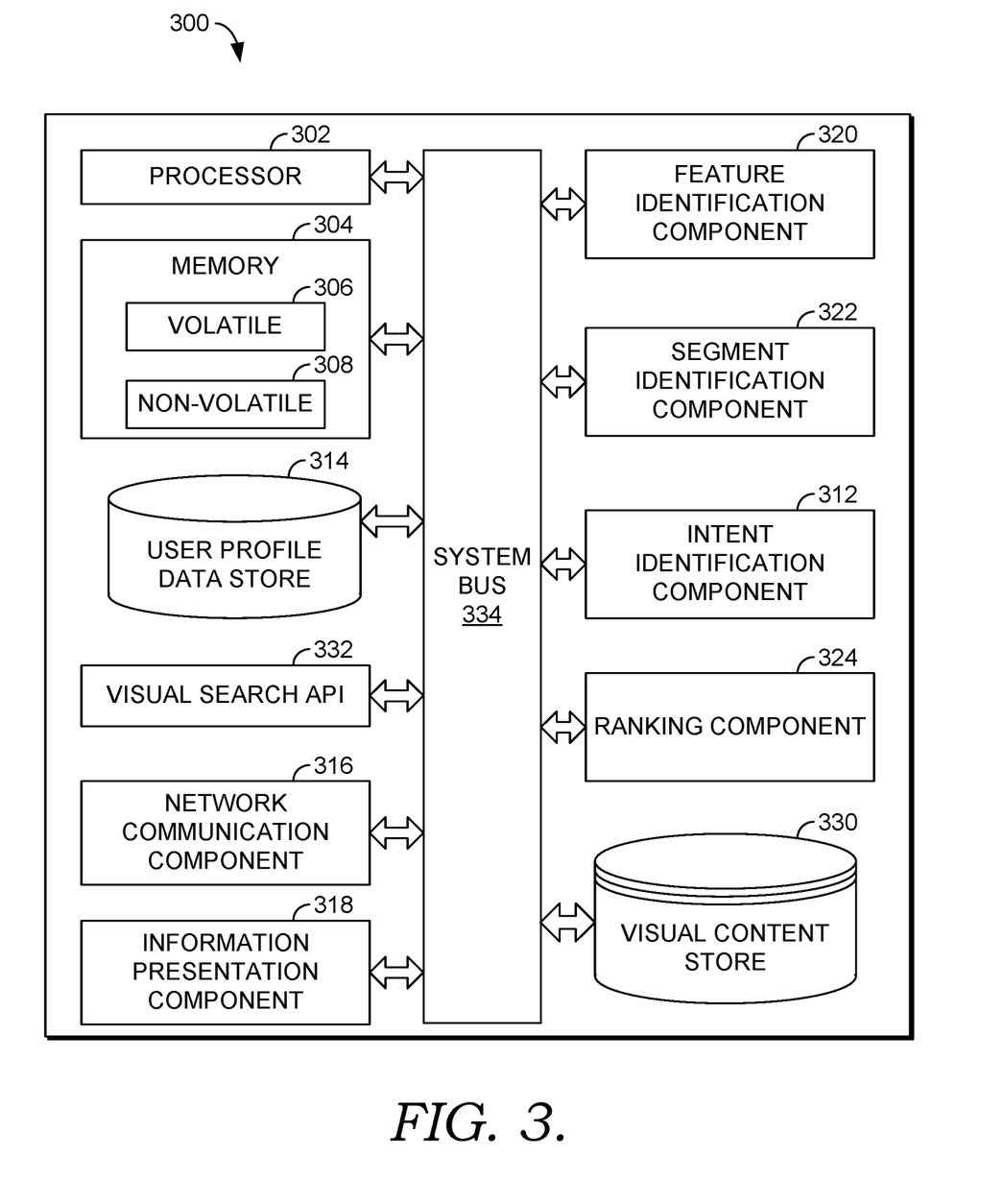
FIG. 3 is a block diagram illustrating exemplary components of a visual search system suitable for use with an aspect of the technology described herein.

Referring now to FIG. 3, a block diagram illustrating exemplary components of a visual search system suitable for use with an aspect of the technology described herein is depicted, and is generally referred to as visual search system 300. Visual search system 300 is but one example of a suitable visual search system and is not intended to suggest any limitation as to the scope of use or functionality of aspects. Neither should visual search system 300 be interpreted as having any dependency or requirement relating to any one or combination of components illustrated.

In an aspect, visual search system 300 is implemented on a single computing device. However, in some aspects, visual search system 300 is implemented on multiple computing devices and/or storage devices. As depicted in FIG. 3, visual search system 300 includes at least one processor 302 (or processing unit) and a memory 304, interconnected by way of a system bus 334. As will be readily appreciated, memory 304 typically (but not always) comprises both volatile memory 306 and non-volatile memory 308. Volatile memory 306 retains or stores information so long as the memory is supplied with power. In contrast, non-volatile memory 308 is capable of storing (or persisting) information even when a power supply is not available. Generally speaking, RAM and CPU cache memory are examples of volatile memory 306 whereas ROM, solid-state memory devices, memory storage devices, and/or memory cards are examples of non-volatile memory 308.

Processor 302 executes instructions retrieved from memory 304 in carrying out various functions, particularly in regard to responding to information requests (such as request 216 of FIG.) regarding image searches. Processor 302 may be comprised of any of various commercially available processors such as single-processor, multi-processor, single-core units, and multi-core units. System bus 334 provides an interface for the various components of the mobile device to inter-communicate. System bus 334 can be of any of several types of bus structures that can interconnect the various components (including both internal and external components). The exemplary visual search system 300 configured as depicted further includes a network communication component 316 for interconnecting visual search system 300 with other network accessible computers, online services, and/or network entities as well as other devices on a computer network, such as network 108 of FIG. 1. This communication may be conducted by network communication component 316 via a wired connection, a wireless connection, or both. As will be readily appreciated by those skilled in the art, a network communication component, such as network communication component 316, is typically comprised of hardware and/or firmware components (and may also include or comprise software components) that transmit and receive digital and/or analog signals.

Also included in visual search system is a visual search API 314. The visual search API 314 is an executable component that implements a service for receiving and responding to image search queries, such as request 216 of FIG. 2. Generally speaking, visual search API 314 is the portal by which a service on a computer user's computing device obtains additional information/images relating to an image. Visual search API 314 interacts with other components (as described below) in processing an image query from a computer user. As discussed with regard to arrow 220 of FIG. 2, a feature identification component 320 identifies features within the query image. Visual search API 314 may be implemented partially or wholly within, or distributed across, an operating system, a Web browser, an online Web site interface, a user device, and so forth. In an aspect, a platform is provided which makes visual search API 314 available to third parties, such as retailers, vendors, service providers, and so forth. In this way, a third party is able to provide an improved search/shopping experience to their customers. For example, a department store, "Acme Retail," may implement access to visual search API 314 on their website, such that a customer may search Acme Retail's products by means of visual search API 314. In such a configuration, searches could be directed toward Acme Retail's product catalog, and the list of potential segments could be tailored to Acme Retail's product lines. Thus, if a user submitted an image of a celebrity wearing a dress, visual search API 314 would not utilize a segment such as "celebrities," because celebrities are not a product line of the department store. A relevant segment might be "dresses," which could constrain image searching to dresses that are within Acme Retail's product catalog. In an aspect, a platform is provided which enables a developer to bootstrap new segments, i.e., create new segments that are not already provided by visual search API 314. Such a platform would include developer tools for defining a segment and the associated parameters specifying a particular class of items associated with the new segment, and/or defining associations between the new segment and specific images that may be stored in, or added to, a visual content store such as visual content store 330.

Once the features are identified, a segment identification component 322 identifies one or more segments associated with the query image. Identification of segments may involve several processes, including accessing a visual content store 330, a user profile data store 314, and/or an interactive refinement process with the user. In an embodiment, historical information regarding other users' searches, purchases, online activities, and so forth, are utilized to identify and/or filter one or more segments associated with an image. Identification of segments may also utilize multi-modal input provided by the user, either implicitly or explicitly, such as data from a Web page that hosts the image, mobile device sensor information, contextual location data, and so forth.

An intent identification component 312 identifies one or more user intents associated with the query image. As with identifying segments, identification of user intents may involve several processes, including accessing visual content store 330, user profile data store, and/or an interactive refinement process with the user. Identification of intent may also utilize multi-modal input provided by the user, either implicitly or explicitly, such as data from a Web page that hosts the image, mobile device sensor information, contextual location data, and so forth. In an aspect, visual search API utilizes the identified user intent(s) and segment(s) to perform an image search that returns search results that are specific to a user task associated with the user intent(s).

An information prioritization component 318 can order and prioritize the search results. This ordering/prioritization may be conducted according to the context of the image query request 216, preferences and/or priorities of the computer user, general user preferences regarding the content, and the like. Additionally or alternatively, information prioritization component 318 may utilize a ranking component 324. In an aspect, ranking component 324 ranks the search results based on visual similarity to the submitted query image. Ranking component 324 may comprise a plurality of individual segment-specific ranking components, and a segment-specific ranking component is selected based on its correspondence to an identified segment associated with the query image. Information presentation component 318 may also process the search results for presentation to the computer user on the computing device 116.

Figure 4:
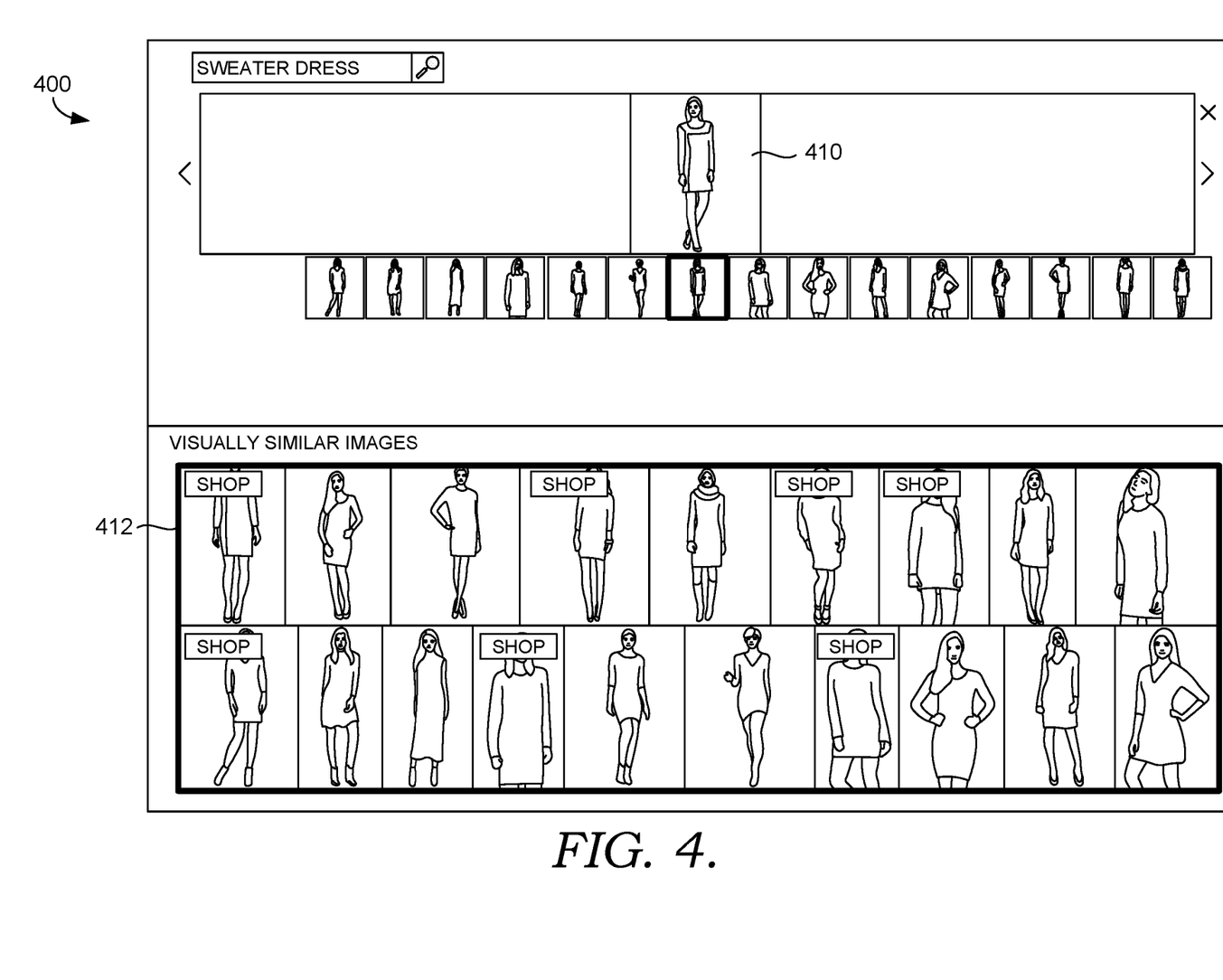
FIG. 4 illustrates an exemplary user interface that is suitable for use with an aspect of the technology described herein.

Referring now to FIG. 4, an exemplary user interface is depicted that is suitable for use with an aspect of the technology described herein, and is generally referred to as user interface 400. User interface 400 is but one example of a suitable user interface and is not intended to suggest any limitation as to the scope of use or functionality of aspects. Neither should user interface 400 be interpreted as having any dependency or requirement relating to any one or combination of components illustrated. User interface 400 depicts a general image search which has been performed, in which a user has selected image 410, and image search results 412 are displayed presenting visually similar images.

Figure 5:
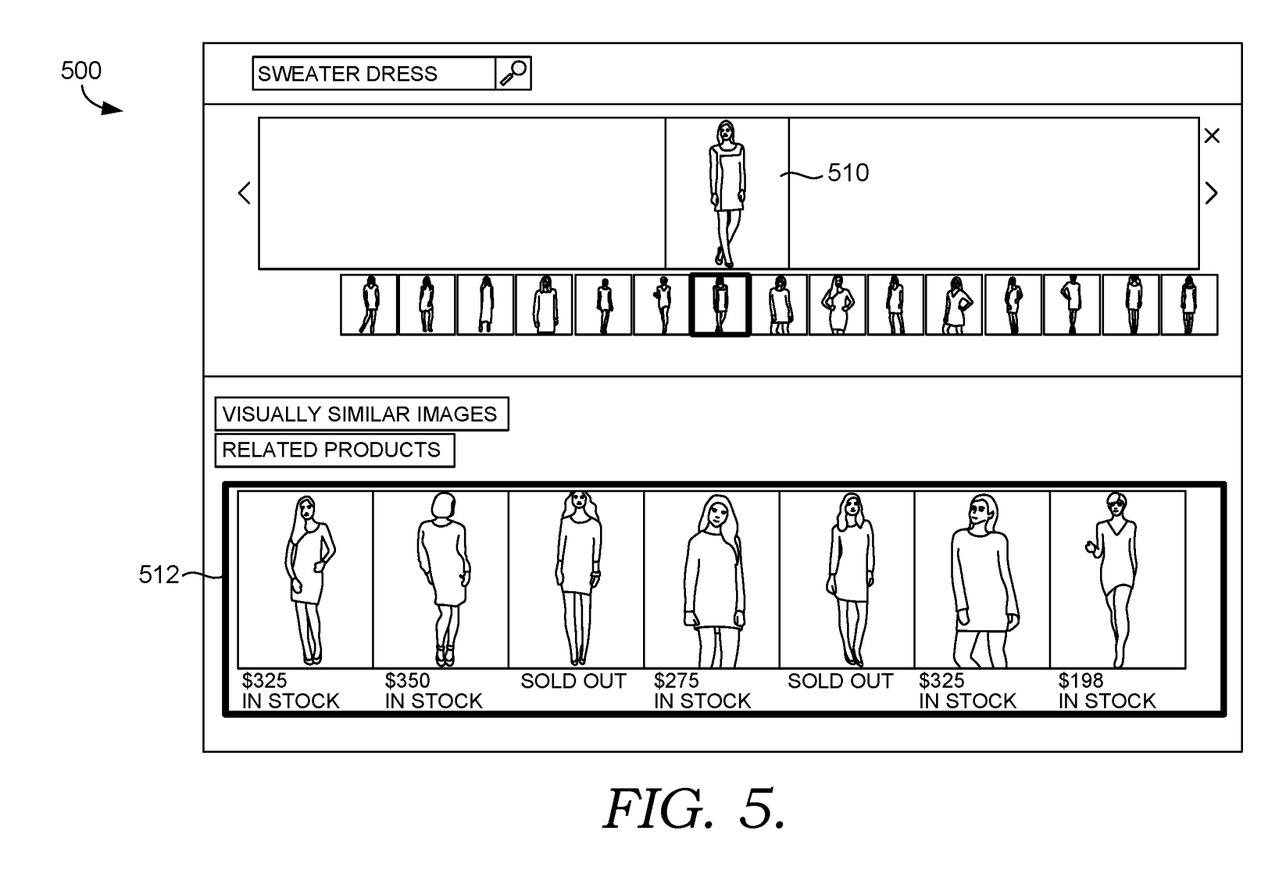
FIG. 5 illustrates an exemplary user interface that is suitable for use with an aspect of the technology described herein.

Referring now to FIG. 5, an exemplary user interface is depicted that is suitable for use with an aspect of the technology described herein, and is generally referred to as user interface 500. User interface 500 is but one example of a suitable user interface and is not intended to suggest any limitation as to the scope of use or functionality of aspects. Neither should user interface 500 be interpreted as having any dependency or requirement relating to any one or combination of components illustrated. User interface 500 depicts a task-focused image search which has been performed, in which a user has selected image 510, and image search results 512 are displayed based on a determination that the user intent is to purchase a dress. Visually similar images are presented, which represent similar dresses for sale, with an indication of the price (or in some cases an indication that the dress is sold out).

In an aspect, a segment-specific ranker is utilized to rank, or order, the presentation of search result images based on visual similarity to the submitted image. The term "segment-specific" means that a ranker is tailored for use with a particular segment. For example, a non-segment-specific ranker may be designed or trained to rank a set of search result images regardless of the subject matter depicted in the submitted image. Thus, whether the query image depicts a bicycle, a dress, a dog, and so forth, the same non-segment-specific ranker may be used to rank the search result images based on visual similarity to the submitted query image. In contrast, a segment-specific ranker is designed and/or trained to rank search result images that fall within a specific segment, e.g., if the query image depicts a bicycle, a segment-specific ranker may be utilized which is specifically trained/designed to rank bicycle images. A segment-specific ranker provides a more accurate ranking than a generic ranker, because it "knows" what characteristics and attributes are typically associated with a bicycle, thus can utilize that specialized knowledge when ranking the search result images.

Figure 6:
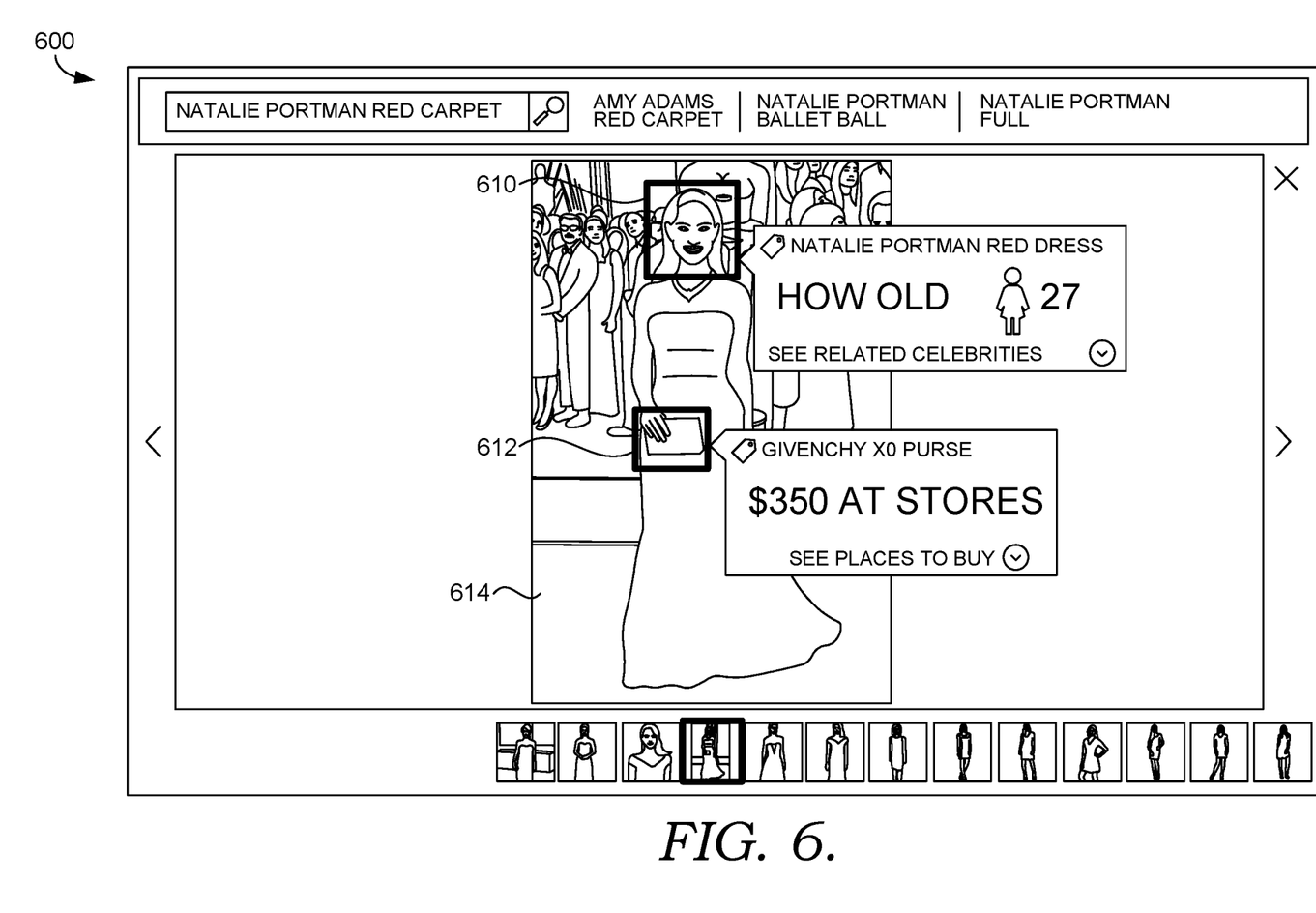
FIG. 6 illustrates an exemplary user interface that is suitable for use with an aspect of the technology described herein.

Referring now to FIG. 6, an exemplary user interface is depicted that is suitable for use with an aspect of the technology described herein, and is generally referred to as user interface 600. User interface 600 is but one example of a suitable user interface and is not intended to suggest any limitation as to the scope of use or functionality of aspects. Neither should user interface 600 be interpreted as having any dependency or requirement relating to any one or combination of components illustrated.

User interface 600 depicts an image 614 which has been submitted to a visual search system for an image search. As depicted in FIG. 6, the visual search system has identified two features in the submitted image—a "face of a celebrity" and a "purse." As a result of the identified features, two segments may be identified—"celebrities" and "purses." In order to identify which segment is most relevant to the user's intent, the visual search system has displayed a bounding box 610 surrounding the celebrity's face, and a bounding box 612 surrounding the purse. In an aspect, when the user selects one of the bounding boxes, the visual search system then constrains the segment to the feature assonated with the selected bounding box. For example, if the user clicks on bounding box 612, the visual search system may identify "purses" as the relevant segment, and would return search results associated with the segment "purses."

Figure 7:
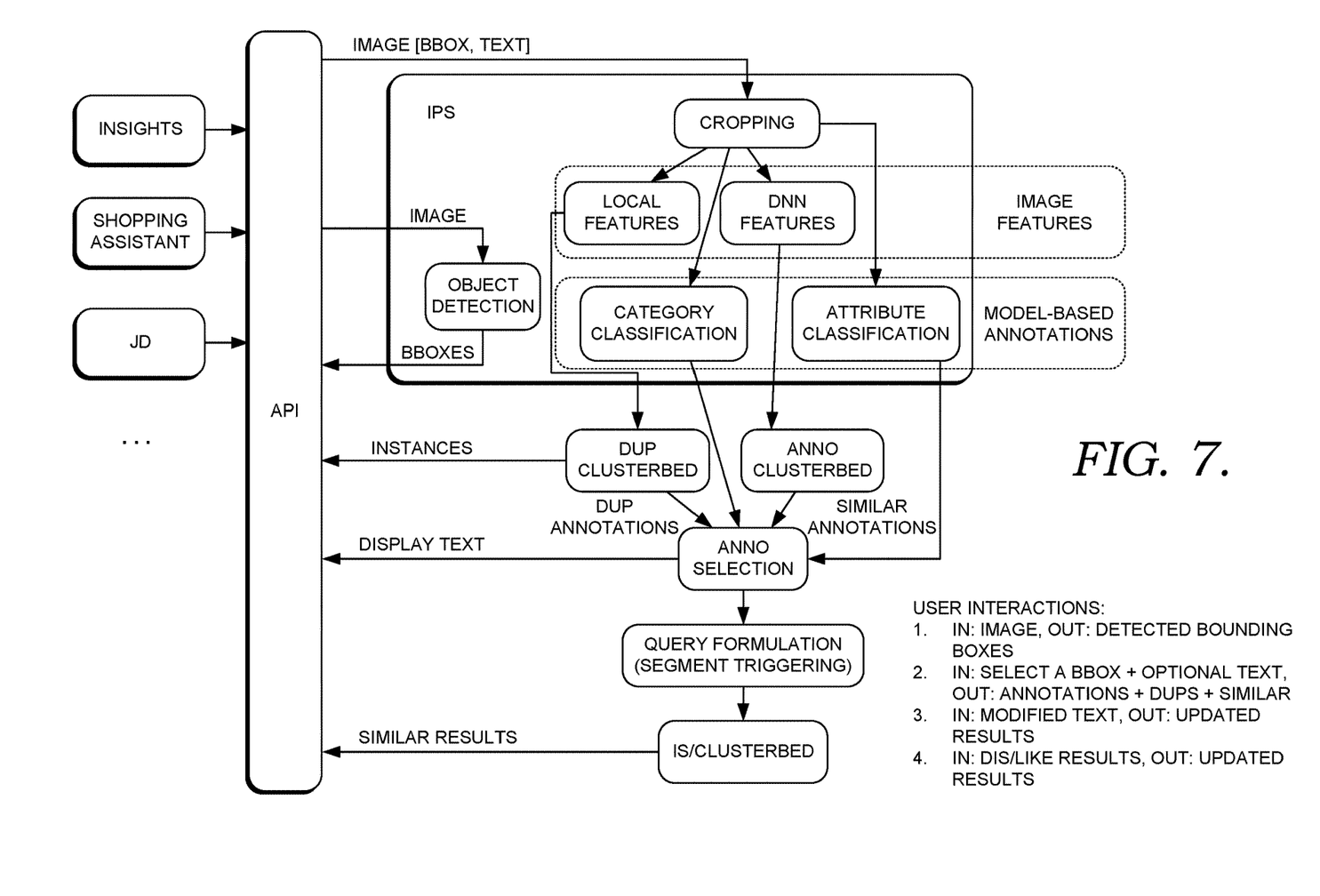
FIG. 7 illustrates an exemplary high-level workflow that is suitable for use with an aspect of the technology described herein.

Referring now to FIG. 7, an exemplary high-level workflow is depicted that is suitable for use with an aspect of the technology described herein, and is generally referred to as workflow 700. Workflow 700 is but one example of a suitable work flow and is not intended to suggest any limitation as to the scope of use or functionality of technology described herein aspects. Neither should workflow 700 be interpreted as having any dependency or requirement relating to any one or combination of components illustrated. Workflow 700 includes some of the processes and functions described above with regard to FIGS. 1-6, such as detecting/identifying objects or features in an image, presenting bounding boxes, segment/category classification, and so forth.

"Insights" refers to the image information/attributes that is aggregated for an image in a visual content store. "JD" refers to a third party that potentially uses a visual search API such as visual search API 314 described above. "Local features" refers to machine-learned features for a local region within an image. "DNN features" refers to deep neural-network-based features for an image. "Category classification" refers to classification of an input image in various categories/segments such as dresses, shoes, food, and so forth. "Attribute classification" refers to derived attributes of an image, such as long dress, tee-length dress, and so forth, which further assist image look-up in a visual content store such as visual content store 330 described above.

"Dup ClusterBed" refers to a cluster bed, which is a machine environment that is used internally for enabling fast look-up based searches for finding visually similar images within a corpus of billions of image within milliseconds. There may be different instances of cluster beds—one to find duplicate images, another one to find visually similar images (nearest neighbor based on visual features), and so forth. "Anno ClusterBed" refers to, once similar pages have been identified, propagating text annotations associated with images from result set to the query image to assist with image searching, using text features. "IS/ClusterBed" refers to additional/different implementations of cluster beds.

Figure 8:
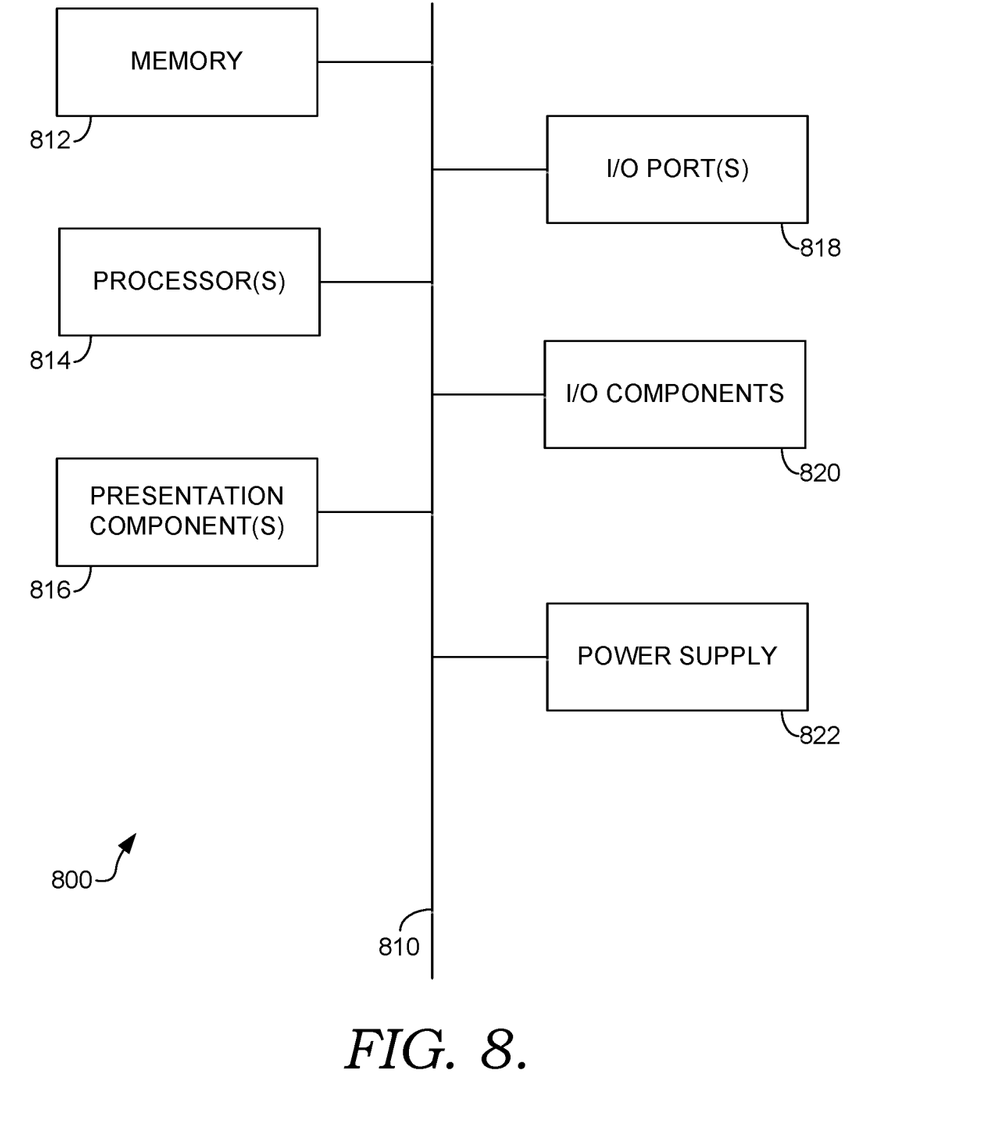
FIG. 8 illustrates an exemplary operating environment suitable for use with an aspect of the technology described herein.

Referring now to FIG. 8, an exemplary operating environment suitable for use with an aspect of the technology described herein is shown and designated generally as computing device 800. Computing device 800 is but one example of a suitable computing environment and is not intended to suggest any limitation as to the scope of use or functionality of aspects. Neither should the computing device 800 be interpreted as having any dependency or requirement relating to any one or combination of components illustrated.

Some aspects of the technology described herein may be described in the general context of computer code or machine-useable instructions, including computer-executable instructions such as program modules, being executed by a computer or other machine, such as a personal digital assistant or other handheld device. Generally, program modules including routines, programs, objects, components, data structures, etc., refer to code that performs particular tasks or implements particular abstract data types. Some aspects of the technology described herein may be practiced in a variety of system configurations, including handheld devices, consumer electronics, general-purpose computers, more specialty computing devices, etc. Some aspects of the technology described herein may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and reference to "computing device."

Computing device 800 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 800.

Memory 812 includes computer-storage media in the form of volatile and/or nonvolatile memory. The memory may be removable, nonremovable, or a combination thereof. Exemplary hardware devices include solid-state memory, hard drives, optical-disc drives, etc. As used herein, computer-storage media does not include signals per se. Computing device 800 includes one or more processors that read data from various entities such as memory 812 or I/O components 820. Presentation component(s) 816 present data indications to a user or other device. Exemplary presentation components include a display device, speaker, printing component, vibrating component, etc. I/O ports 818 allow computing device 800 to be logically coupled to other devices including I/O components 820, some of which may be built in. Illustrative components include a microphone, joystick, game pad, satellite dish, scanner, printer, wireless device, etc.

From the foregoing, it will be seen that the technology described herein is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made of the technology described herein without departing from the scope thereof, it is to be understood that all matter herein set forth or shown in the accompanying drawings is to be interpreted as illustrative and not in a limiting sense.

EMBODIMENTS

Embodiment 1

A method of image searching, comprising: generating a user interface that receives, from a user, a designation of an image for a search query; receiving, via the user interface, the search query which includes the designation of the image; accessing a visual content store which includes stored images and attributes associated with the stored images; identifying from the visual content store one or more attributes associated with the image; identifying a user-intended task associated with the image based on the one or more attributes associated with the image; generating search results associated with the user-intended task; and presenting the search results to the user via the user interface.

Embodiment 2

The method of embodiment 1, wherein the one or more attributes associated with the image include information regarding one or more of searches, purchases, and/or online activities, performed by one or more users.

Embodiment 3

The method of embodiments 1 or 2, wherein identifying the user-intended task associated with the image comprises: identifying one or more potential user-intended tasks associated with the image based on the one or attributes associated with the image; presenting on the user interface an option for the user to select from the one or more potential user-intended tasks, and receiving a selection of a potential user-intended task, wherein the selected potential user-intended task is identified as the user-intended task associated with the image.

Embodiment 4

The method of embodiments 1 or 2, wherein identifying the user-intended task associated with the image comprises: identifying one or more potential user-intended tasks associated with the image based on the one or attributes associated with the image; presenting on the user interface an option for the user to select one or more refinement parameters; receiving a selection of one or more refinement parameters; and utilizing the selected one or more refinement parameters to identify the user-intended task from among the identified one or more potential user-intended tasks.

Embodiment 5

The method of embodiments 1, 2, 3, or 4, wherein identifying from the visual content store one or more attributes associated with the image comprises: determining that a stored image in the visual content store matches the image; and identifying one or more attributes associated with the stored image as the one or more attributes associated with the image.

Embodiment 6

The method of embodiments 1, 2, 3, 4, or 5, further comprising identifying a segment associated with the image, wherein the generated search results are associated with the user-intended task and the segment.

Embodiment 7

The method of embodiment 6, wherein identifying the segment associated with the image comprises: analyzing content of the image to identify one or more potential segments associated with the image, presenting on the user interface an option for the user to select from the one or more potential segments, and receiving a selection of a potential segment, wherein the selected potential segment is identified as the segment associated with the image.

Embodiment 8

The method of embodiment 7, wherein analyzing content of the image to identify one or more potential segments associated with the image comprises: accessing a database that includes stored images and associations between the stored images and respective attributes, determining that the database includes a stored image that matches the image, identifying one or more segments associated with the stored image based on the respective attributes associated with the stored image, and identifying the one or more segments associated with the stored image as the one or more potential segments associated with the image.

Embodiment 9

The method of embodiment 7, wherein analyzing content of the image to identify one or more potential segments associated with the image comprises: utilizing an image recognition technique to identify one or more features depicted in the image; accessing a database that associates one or more attributes with the identified one or more features; and identifying the one or more potential segments based on the one or more attributes associated with the identified one or more features.

Embodiment 10

The method of embodiment 8, wherein determining that the stored image in the database matches the image comprises one or more of: determining that the image is an exact match to the stored image; determining that the image is an altered version of the stored image; or determining that the stored image is an altered version of the image.

Embodiment 11

One or more computer-storage media having embodied thereon computer-usable instructions which, when executed by one or more computing devices, perform a method of image searching, comprising: generating a user interface that receives, from a user, a designation of an image for a search query; receiving, via the user interface, the search query which includes the designation of the image; accessing a visual content store which includes stored images and attributes associated with the stored images; identifying from the visual content store one or more attributes associated with the image based at least in part on a correspondence between the image and a stored image; identifying a category associated with the image based at least in art on the one or attributes associated with the image; identifying a user-intended task associated with the image; performing an image search constrained by the category, wherein search results are generated; filtering the search results based on the user-intended task; and presenting the search results to the user via the user interface.

Embodiment 12

The media of embodiment 11, wherein the one or more attributes associated with the image include information regarding one of more of searches, purchases, and/or online activities, performed by one or more users.

Embodiment 13

The media of embodiments 11 or 12, wherein identifying the user-intended task associated with the image comprises: identifying one or more potential user-intended tasks associated with the image based on the one or attributes associated with the image; presenting on the user interface an option for the user to select from the one or more potential user-intended tasks, and receiving a selection of a potential user-intended task, wherein the selected potential user-intended task is identified as the user-intended task associated with the image.

Embodiment 14

The media of embodiments 11 or 12, wherein identifying the user-intended task associated with the image comprises: identifying one or more potential user-intended tasks associated with the image based on the one or attributes associated with the image; presenting on the user interface an option for the user to select one or more refinement parameters; receiving a selection of one or more refinement parameters; and utilizing the selected one or more refinement parameters to identify the user-intended task from among the identified one or more potential user-intended tasks.

Embodiment 15

The media of embodiments 11 or 12, wherein identifying the user-intended task associated with the image comprises identifying a user-intended task associated with the stored image in the visual content store.

Embodiment 16

The media of embodiments 11, 12, 13, 14, or 15, wherein the correspondence between the image and the stored image is based at least in part on: A) a determination that the image is an exact match to the stored image, B) a determination that the image is an altered version of the stored image, or C) a determination that the stored image is an altered version of the image.

Embodiment 17

A system for performing an image search, comprising: one or more computer-storage media; one or more processors that A) receive a search query comprising an image, B) identify segments associated with the image based on a correspondence between the image and a stored image in the visual content store, wherein the visual content store associated attributes with stored images, C) present a user-selectable option to the user, wherein the user-selectable option enables a user selection from among the identified segments, D) receive a selection of a segment, E) identify a user-intended task associated with the segment, F) utilize the image to generate search results constrained by the segment and the user-intended task, and G) present the respective search results to the user.

Embodiment 18

The system of embodiment 17, wherein identify the user-intended task associated with the segment comprises: analyze content of the image to identify one or more potential user-intended tasks associated with the segment, present on a user interface an option for the user to select from the one or more potential user-intended tasks, and receive a selection of a potential user-intended task, wherein the selected potential user-intended task is identified as the user-intended task associated with the image.

Embodiment 19

The system of embodiment 17, wherein identify the user-intended task associated with the segment comprises: analyze content of the image to identify one or more potential user-intended tasks associated with the segment, present on a user interface an option for the user to select one or more refinement parameters, receive a selection of one or more refinement parameters, and utilize the selected one or more refinement parameters to identify the user-intended task from among the identified one or more potential user-intended tasks.

Embodiment 20

The system of embodiments 17, 18, or 19, wherein the correspondence between the image and the stored image is based at least in part on: A) a determination that the image is an exact match to the stored image, B) a determination that the image is an altered version of the stored image, or C) a determination that the stored image is an altered version of the image.

What is claimed:
1. A method of providing a user interface for task-focused image searching, comprising:
  generating the user interface that receives, from a user, a designation of an image for a search query;
  receiving, via the user interface, the search query which includes the designation of the image;
  accessing a visual content store comprising a database of stored images and annotations associated with the stored images, wherein the annotations describe attributes of the images;
  based on a match between the image and an image in the visual content store, and on one or more annotations associated with the image in the visual content store, identifying from the visual content store one or more attributes associated with the image;
  identifying a user-intended task associated with the image based on the one or more attributes associated with the image, wherein the identifying comprises:
    identifying one or more potential user-intended tasks associated with the image based on the one or more attributes associated with the image,
    presenting on the user interface an option for the user to select from the one or more potential user-intended tasks, and
    receiving a selection of a potential user-intended task from the one or more potential user-intended tasks, wherein the selected potential user-intended task is identified as the user-intended task associated with the image;
  generating search results associated with the user-intended task, wherein the search results enable the user to perform the user-intended task; and
  presenting the search results to the user via the user interface.

2. The method of claim 1, wherein the one or more attributes associated with the image include information regarding one or more of searches, purchases, and/or online activities, performed by one or more users.

3. The method of claim 1, wherein identifying the user-intended task associated with the image comprises:
  identifying one or more potential user-intended tasks associated with the image based on the one or more attributes associated with the image;
  presenting on the user interface an option for the user to select from the one or more potential user-intended tasks, and receiving a selection of a potential user-intended task, wherein the selected potential user-intended task is identified as the user-intended task associated with the image.

4. The method of claim 1, wherein identifying the user-intended task associated with the image comprises:
identifying one or more potential user-intended tasks associated with the image based on the one or more attributes associated with the image;
presenting on the user interface an option for the user to select one or more refinement parameters;
receiving a selection of one or more refinement parameters; and
utilizing the selected one or more refinement parameters to identify the user-intended task from among the identified one or more potential user-intended tasks.

5. The method of claim 1, wherein identifying from the visual content store one or more attributes associated with the image comprises:
determining that a stored image in the visual content store matches the image; and
identifying one or more attributes associated with the stored image as the one or more attributes associated with the image.

6. The method of claim 1, further comprising identifying a segment associated with the image, wherein the generated search results are associated with the user-intended task and the segment.

7. The method of claim 6, wherein identifying the segment associated with the image comprises:
analyzing content of the image to identify one or more potential segments associated with the image,
presenting on the user interface an option for the user to select from the one or more potential segments, and
receiving a selection of a potential segment, wherein the selected potential segment is identified as the segment associated with the image.

8. The method of claim 7, wherein analyzing content of the image to identify one or more potential segments associated with the image comprises:
accessing a database that includes stored images and associations between the stored images and respective attributes,
determining that the database includes a stored image that matches the image,
identifying one or more segments associated with the stored image based on the respective attributes associated with the stored image, and
identifying the one or more segments associated with the stored image as the one or more potential segments associated with the image.

9. The method of claim 7, wherein analyzing content of the image to identify one or more potential segments associated with the image comprises:
utilizing an image recognition technique to identify one or more features depicted in the image;
accessing a database that associates one or more attributes with the identified one or more features; and
identifying the one or more potential segments based on the one or more attributes associated with the identified one or more features.

10. The method of claim 8, wherein determining that the stored image in the database matches the image comprises one or more of:
determining that the image is an exact match to the stored image;
determining that the image is an altered version of the stored image;
or
determining that the stored image is an altered version of the image.

11. One or more non-transitory computer-storage media having embodied thereon computer-usable instructions which, when executed by one or more computing devices, perform a method of providing a user interface for task-focused image searching, comprising:
generating the user interface that receives, from a user, a designation of an image for a search query;
receiving, via the user interface, the search query which includes the designation of the image;
accessing a visual content store comprising a database of stored images and annotations associated with the stored images, wherein the annotations describe attributes of the images;
identifying from the visual content store one or more attributes associated with the image based at least in part on a correspondence between the image and an image in the visual content store, and one or more annotations associated with the image in the visual content store;
identifying a category associated with the image based at least in part on the one or more attributes associated with the image, wherein the identifying comprises:
identifying one or more potential categories based on the one or more attributes,
presenting on the user interface a graphical indication of the one or more potential categories, receiving via the user interface a selection of a potential category, and identifying the selected potential category as the category associated with the image;
identifying a user-intended task associated with the image; performing an image search constrained by the category, wherein search results are generated;
filtering the search results based on the user-intended task;
presenting the filtered search results to the user via the user interface.

12. The media of claim 11, wherein the one or more attributes associated with the image include information regarding one of more of searches, purchases, and/or online activities, performed by one or more users.

13. The media of claim 11, wherein identifying the user-intended task associated with the image comprises:
identifying one or more potential user-intended tasks associated with the image based on the one or more attributes associated with the image;
presenting on the user interface an option for the user to select from the one or more potential user-intended tasks, and
receiving a selection of a potential user-intended task, wherein the selected potential user-intended task is identified as the user-intended task associated with the image.

14. The media of claim 11, wherein identifying the user-intended task associated with the image comprises:
identifying one or more potential user-intended tasks associated with the image based on the one or more attributes associated with the image;
presenting on the user interface an option for the user to select one or more refinement parameters;
receiving a selection of one or more refinement parameters; and utilizing the selected one or more refinement parameters to identify the user-intended task from among the identified one or more potential user-intended tasks.

15. The media of claim 11, wherein identifying the user-intended task associated with the image comprises identifying a user-intended task associated with the stored image in the visual content store.

16. The media of claim 11, wherein the correspondence between the image and the stored image is based at least in part on:
   a determination that the image is an exact match to the stored image,
   a determination that the image is an altered version of the stored image, or
   a determination that the stored image is an altered version of the image.

17. A system for providing a user interface for task-focused image search, comprising:
   one or more computer-storage media;
   one or more processors that
      generate the user interface,
      receive, via the user interface, a search query comprising an image,
      access a visual content store that comprises a database of stored images and attributes associated with the stored images,
      based on a correspondence between the image and a stored image in the visual content store, identify one or more attributes associated with the image;
      identify one or more segments associated with the image based on the one or more attributes,
      present on the user interface a user-selectable option to the user, wherein the user-selectable option comprises one or more bounding boxes depicted on the image, wherein each of the one or more bounding boxes encloses a feature in the image corresponding to an identified segment associated with the image, wherein the user-selectable option enables a user selection from among the identified segments,
      receive a selection of a bounding box associated with a segment,
      identify a user-intended task associated with the segment,
      utilize the image to generate search results constrained by the segment and the user-intended task, and
      present the respective search results to the user.

18. The system of claim 17, wherein identify the user-intended task associated with the segment comprises:
   analyze content of the image to identify one or more potential user-intended tasks associated with the segment,
   present on a user interface an option for the user to select from the one or more potential user-intended tasks, and
   receive a selection of a potential user-intended task, wherein the selected potential user-intended task is identified as the user-intended task associated with the image.

19. The system of claim 17, wherein identify the user-intended task associated with the segment comprises:
   analyze content of the image to identify one or more potential user-intended tasks associated with the segment,
   present on a user interface an option for the user to select one or more refinement parameters,
   receive a selection of one or more refinement parameters, and
   utilize the selected one or more refinement parameters to identify the user-intended task from among the identified one or more potential user-intended tasks.

20. The system of claim 17, wherein the correspondence between the image and the stored image is based at least in part on:
   a determination that the image is an exact match to the stored image,
   a determination that the image is an altered version of the stored image, or
   a determination that the stored image is an altered version of the image.

* * * * *